(12) United States Patent
Greenwald et al.

(10) Patent No.: US 7,654,191 B2
(45) Date of Patent: Feb. 2, 2010

(54) BEVERAGE DISPENSER

(75) Inventors: Shlomo Greenwald, Ithaca, NY (US); Zipora Greenwald, Ithaca, NY (US)

(73) Assignee: Greenwald Technologies, LLC, Ithaca, NY (US)

( * ) Notice: Subject to any disclaimer, the term of this patent is extended or adjusted under 35 U.S.C. 154(b) by 811 days.

(21) Appl. No.: 11/155,058

(22) Filed: Jun. 17, 2005

(65) Prior Publication Data

US 2006/0005712 A1  Jan. 12, 2006

Related U.S. Application Data

(60) Provisional application No. 60/586,105, filed on Jul. 7, 2004, provisional application No. 60/642,311, filed on Jan. 7, 2005, provisional application No. 60/682,107, filed on May 18, 2005.

(51) Int. Cl.
*A47J 31/00* (2006.01)
*B67D 5/56* (2006.01)

(52) U.S. Cl. .............. 99/275; 99/279; 99/290; 99/323.3; 222/129.1; 222/129.3; 222/146.2

(58) Field of Classification Search .............. 99/275, 99/279, 286, 290, 300, 323.3; 222/129.1, 222/129.2, 146.1, 146.2, 129.3, 129.4
See application file for complete search history.

(56) References Cited

U.S. PATENT DOCUMENTS

| | | | |
|---|---|---|---|
| 2,657,628 A | 11/1953 | Von Stoeser | |
| 2,682,984 A | 7/1954 | Melikian et al. | |
| 2,712,887 A | 7/1955 | King | |
| 2,776,074 A | 1/1957 | St. Laurence | |
| 2,838,077 A | 6/1958 | Cooper | |
| 3,532,505 A | 10/1970 | Cornelius | |
| 3,634,107 A | 1/1972 | Cornelius | |
| 3,641,918 A | 2/1972 | Schellgell | |
| 3,795,788 A | 3/1974 | Perucca | |
| 4,137,833 A | 2/1979 | Yelloz | |
| 4,140,150 A | 2/1979 | Rundall | |
| 4,470,999 A | 9/1984 | Carpiac | |
| 4,550,651 A | 11/1985 | Haynes | |
| 4,649,809 A | 3/1987 | Kanezashi | |
| 4,757,752 A | 7/1988 | Robins et al. | |
| 4,791,860 A | 12/1988 | Verheijen | |
| 4,792,059 A | 12/1988 | Kerner et al. | |
| 4,920,871 A | 5/1990 | Anson | |
| 5,014,611 A | 5/1991 | Illy et al. | |
| 5,042,689 A | 8/1991 | Mrugala et al. | |
| 5,497,918 A | 3/1996 | Brilanchik | |
| 5,551,331 A | 9/1996 | Pfeifer | |
| 5,584,229 A | 12/1996 | Anson | |
| 5,724,883 A | 3/1998 | Usherovich | |
| 5,858,437 A | 1/1999 | Anson | |
| 5,975,365 A * | 11/1999 | Hsieh | 222/129.4 |
| 6,019,032 A * | 2/2000 | Arksey | 99/452 |
| 6,460,735 B1 * | 10/2002 | Greenwald et al. | 222/146.1 |
| 6,889,600 B2 | 5/2005 | Rava | |
| 2004/0118290 A1 * | 6/2004 | Cai | 99/275 |

* cited by examiner

*Primary Examiner*—Reginald L Alexander
(74) *Attorney, Agent, or Firm*—Brown & Michaels, PC

(57) ABSTRACT

A beverage dispenser and method of operation, in which incoming water for beverage preparation is heated by a liquid-to-liquid heat exchanger. The heated water may be mixed with cold water using controlled valves, to generate a selected temperature stream. This controlled-temperature stream may be mixed with beverage concentrate or sprayed over coffee grounds to brew fresh coffee.

25 Claims, 6 Drawing Sheets

BEVERAGE DISPENSER

REFERENCE TO RELATED APPLICATIONS

This application claims an invention which was disclosed in the following Provisional Applications:

Ser. No. 60/586,105, filed Jul. 7, 2004, entitled "Hot Beverage Dispenser".

Ser. No. 60/642,311, filed Jan. 7, 2005, entitled "Beverage Dispenser with Disposable Pump"

Ser. No. 60/682,107, filed May 18, 2005, entitled "Plastic Pump for Beverage and Soap Dispensing"

The benefit under 35 USC § 119(e) of these United States provisional applications is hereby claimed, and the aforementioned applications are hereby incorporated herein by reference.

BACKGROUND OF THE INVENTION

1. Field of the Invention

The invention pertains to the field of beverage dispensers. More particularly, the invention pertains to hot beverage dispensers using liquid concentrate or materials from which beverages are extracted by hot water.

2. Description of Related Art

Embodiments of the invention described below include liquid concentrate and brewing machines for hot beverages, particularly coffee.

Basically all commercial coffee brewers operate in the same way, where the difference between one brand to the other is in added features and look. The brewers have a water heating tank of 1-2 gallons with high power heating elements of 4-7 kw. They fill the tank with water and heat the water to the brewing temp. which is between 180-190° F. The hot water is pushed out by the increased thermal pressure or by gravity into the spraying head which sprays hot water on the ground coffee beans.

This method suffers from numerous disadvantages which result in an imperfect brewing.

A. Optimal brewing temperature for coffee is 200-205° F. In the current brewing method they cannot brew above 180-190° F. since the resulting coffee becomes dangerous to consume. Drinking hot beverages at temperature above 180° F. can cause serious mouth burns.

B. The brewing time for 1 to 2 gallons of coffee is of the order of 10 to 15 minutes, which is too long for optimal extraction. Long extraction time degrades the quality and taste of the brewed coffee.

C. Nonuniform extraction due to nonuniform flow of the hot water through the granular coffee bed. This effect is referred to as "channeling"—the hot water creates channels through the ground coffee.

D. Inefficient extraction which results in low soluble and flavor yield.

E. In order to be ready for the next brewing the brewer operator will fill it with water and keep the water at brewing temperature (180-190° F.) until the next brewing batch, which might be few minutes or few hours. When the hot water is sitting in the water tank for long period of time it depletes its Oxygen and mineral which degrades the water and therefore the coffee taste.

D. Over time, the deposition of water minerals on the tank walls and heating elements builds layers of "stone" which degrades the brewer performance and shortens its useful life time.

In the trade, coffee in liquid concentrate form is often called "Liquid Coffee". The terms "liquid beverage concentrate" and "liquid coffee" are used interchangeably in this application. It will be understood that these terms could also apply to other liquid concentrate beverages, such as hot chocolate, espresso, cappuccino, mulled cider, etc.

Beverage dispensers using liquid beverage concentrate, which is mixed with hot water to dispense hot coffee or chocolate or the like are known to the art. U.S. Pat. No. 3,634,107, "Apparatus for Dispensing Coffee Beverage" is an example of one such device.

In prior art liquid coffee dispensers, the hot water to be mixed with the concentrate is held in large (typically 4-6 gallon) tanks maintained at high temperature. Water is fed by gravity from the tank, and is mixed with liquid coffee concentrate at or near the dispensing spigot. Incomplete mixing often leads to "stripes" of dark concentrate and clear water leaving the spigot, with the beverage variably and incompletely mixing in the cup.

Hot water drawn out made up by incoming tap water at low temperature, so that the temperature in the tank varies as the dispenser is used—the more coffee dispensed, the lower the temperature, as cool makeup water dilutes the hot water in the tank.

The gravity feed is relatively low in pressure, and this means that it takes the water flow a longer time to reach flow equilibrium, during which time the ratio of concentrate to water varies considerably from the desired ratio. This results in an inconsistent coffee taste.

As the hot water is held, entrained oxygen escapes, and minerals in the water deposit on the walls of the tank and heating elements, leaving the water "flat". The flat water does not release as much aroma from the concentrate as would be desirable and the dispensed beverage does not have the desired flavor. The deposited minerals flake off the tank walls, putting occasional flakes of mineral in the cup and giving an "off" taste to the beverage.

Keeping a beverage dispensing system clean is a key to good-tasting beverages, yet prior art machines are not designed to promote easy and regular cleaning.

Such machines are supposed to have a daily cleaning, where plain water is run through the mix section (only) of the machine. Weekly, the containers of concentrate should be removed and replaced with a bag of water and sanitizing chemical, to clean the product dispensing part of the machine. In practice, neither is done, and the beverage and other contaminants build up on the walls of the tubing, imparting an "off" flavor to the dispensed beverage. At worst there is a possibility of growth of bacteria or other harmful organisms in the tubing and dispensing areas.

SUMMARY OF THE INVENTION

The liquid beverage concentrate dispenser of the invention is different from the liquid coffee concentrate dispensers on the market mainly in five ways:

1. Incoming high pressure fresh water is heated instantly in a heat exchanger heated by an external source of circulating fluid, rather than being heated and stored in a tank within the dispenser which is open to the air.

Using an external closed loop heater to heat the incoming high pressure fresh water instantly, via Heat-Exchanger, has many advantages which improves the aroma, look and taste of the dispensed coffee. The advantages are:

Since the beverage water is not held, the concentrate is mixed with fresh hot water rich in Oxygen, giving an improved aroma.

Fresh hot water has no depletion of minerals from deposition on the walls of a holding tank, improving the taste.

Fresh hot water is supplied at high pressure (typically 14-16 psi).

Complete mixing with no "stripes" due to the high velocity water flow.

An increased heat capacity for the same heater (volume and power), typically by 30-40 percent. This will allow dispensing larger number of cups per unit time.

An increased of the operating life of the heating element.

Using an external water heater eliminates heat leakage from the holding tank to the liquid coffee concentrate in the machine, allowing the concentrate to remain at ambient temperature. This increases the liquid coffee's lifetime by minimizing the thermal degradation of the concentrate.

2. By accurately mixing concentrate and hot and cold water using a novel design of a digital "forward looking" control system to continuously control the liquid coffee concentrate pump according to the dispensed coffee flow rate, the invention permits a very high consistency and accuracy of mixing ratio between the water and the liquid coffee. This improves taste and appearance.
3. In a preferred embodiment, the dispenser has an automatic washing system which allows the machine to be completely and effectively washed and sanitized.
4. In a preferred embodiment, each consumer is able to select the dispensed coffee temperature, ranging from cold coffee to very hot coffee.
5. In a preferred embodiment, each consumer is able to select the dispensed coffee strength.

DETAILED DESCRIPTION OF THE INVENTION

The dispenser of the invention allows each consumer to select the dispensed coffee temperature according to his or her preference. This differentiating feature will increase consumers' satisfaction since it has been established that many consumers would welcome the opportunity to order coffee at a temperature reflecting their personal preference. Also, it will reduce the risk of burns from an unexpectedly hot coffee serving.

Figure 1:
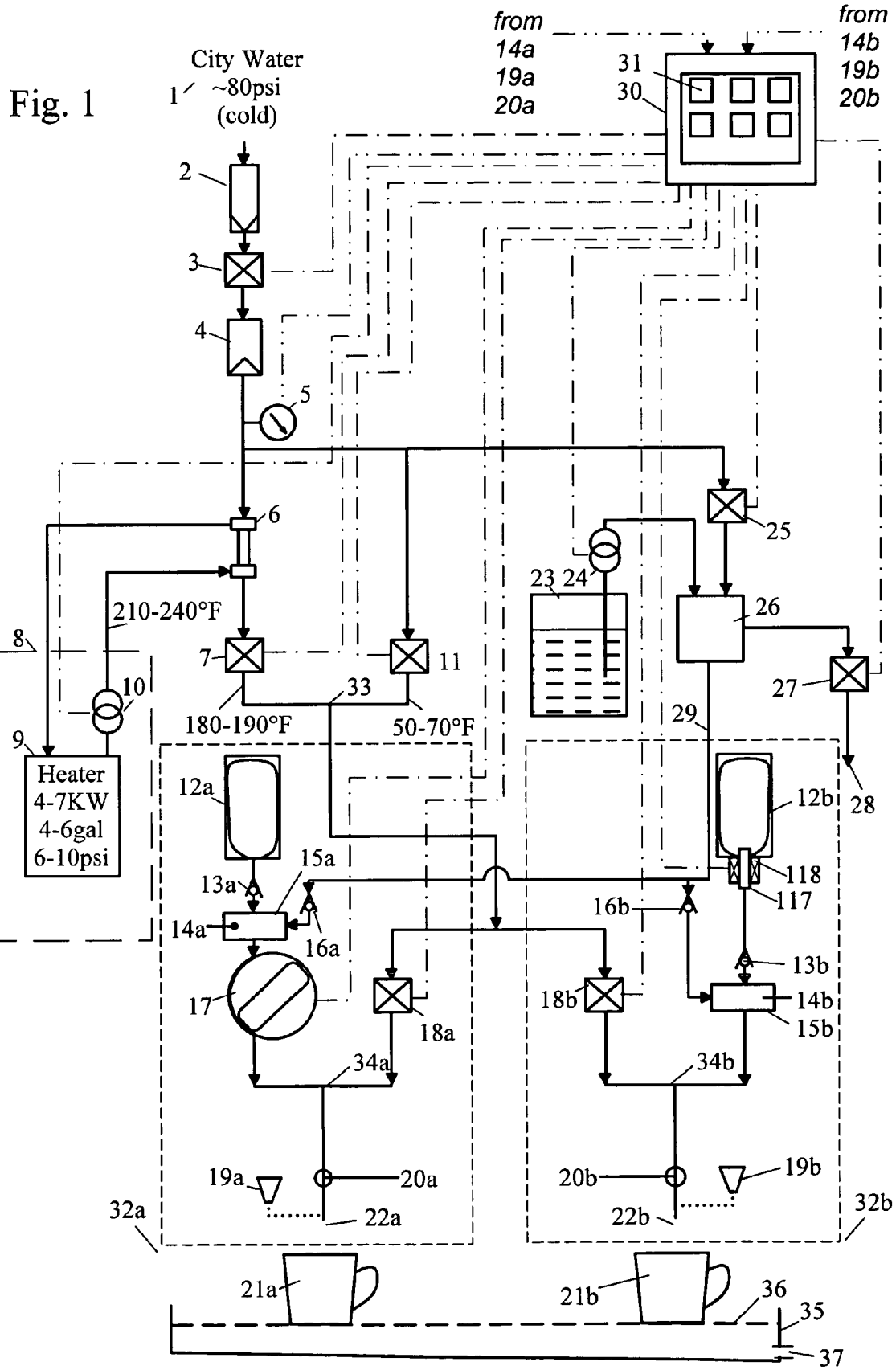
FIG. 1 shows an overall block diagram of an embodiment of the invention.

FIG. 1 shows a block diagram of the preferred embodiment of the liquid coffee dispenser of the invention.

Incoming water 1 is fed into the machine in a conventional fashion. Normal "city water" or "tap water" is supplied at a pressure of typically about 40-80 psi at a variable, but cold, temperature of typically 50-60° F. or less. If the tap water in an area is not potable, it will be understood that the "City Water" term would contemplate the use of bottled water or well water instead. The incoming water is filtered 2, preferably in a conventional cartridge filter, and input valve 3 allows the fluid supply to be cut off as needed.

Some pressure regulators require flow in order to regulate pressure at the output. Without flow, the pressure at the input and output is the same. If regulator 4 cannot maintain a regulated pressure without flow, input valve 3 should be closed between dispensing. Otherwise, it may remain open or closed as desired.

The input water supply is regulated by a pressure regulator 4 down to typically 16-20 psi pressure (depending on the characteristics of valves 7 and 11 and the required dispensed coffee flow rate). The flow of water is measured by a flow meter 5, for purposes which will be explained below. After the flow meter, the incoming water is split into two, or preferably three, branches—one to be heated (controlled by hot water solenoid valve 7), one for cold water supply (controlled by cold water solenoid valve 11) and, in the preferred embodiment, one to the automatic wash circuit (controlled by wash water solenoid valve 25), as will be explained below.

The water to be heated is fed into a liquid-to-liquid heat exchanger 6, where it is heated to approximately 180-190° F. The heat supply to the heat exchanger 6 is a flow of heated liquid at approximately 210-240° F. from an external heat supply 8, comprising a heater in fluid tank 9 and circulating pump 10. Preferably, the heater is an electric heater of 4-7 KW capacity, and the tank holds 4-6 gallons of fluid. The pump 10 is preferably capable of circulating the fluid at a pressure of 6-10 psi. Since the circulating fluid is not consumed and does not contact the beverage to be dispensed, there is no need for maintaining the sterility of the circulating system, and a non-potable fluid could be circulated if desired. Distilled water would be an appropriate fluid, perhaps with additives to minimize bacteria growth in the tank.

The location of the large storage tank and heater for the circulating fluid external to the dispenser allows the footprint of the dispenser to be significantly reduced compared to dispensers which must maintain hot water or beverage internally. This is a major advantage in the restaurant market, where countertop space is at a premium. Because the source of heat is external to the dispenser, the heat exchanger is the only part of the dispenser which gets hot. Therefore, the heat exchanger is preferably well insulated to minimize heat leakage to the dispenser, allowing it to remain at ambient temperature. The internal design and maintenance of the dispenser is also simplified by eliminating the need to design around a large, hot tank, and the fluid in the external tank can be kept at a higher temperature, which will increase its heat capacity, than would be desirable or safe if the stored hot water was being dispensed as in prior art dispensers.

The hot water from the hot water solenoid valve 7 and the cold water from the cold water solenoid valve 11 are joined at a "T" junction 33 into a mixed water stream. The valves are preferably fast-acting solenoid valves which can be opened and closed quickly under control of the microprocessor controller 30. Preferably, the control of the valves is by pulse-width modulation, in which the valves are turned fully on and fully off, and the flow is controlled by varying the ratio of "on" and "off" times ("duty cycle"). By controlling the duty cycle of valves 7 and 11, any temperature water between the hot supply temperature of 180-190° F. and the cold supply temperature of 50-70° F. can be produced at the beverage output (or in the cup by the mixing of pulses of hot and cold water). Alternatively, proportional valves could be used at 7 and 11, and the temperature controlled by controlling the volume of flow through the valves. This will enable the dispensing of not only hot beverages, but also cold beverages.

The temperature of the dispensed beverage could be controllable in a continuous range, or discontinuously with a "cold" selection and a range of "hot" temperatures (say, 130-

190° F.). The latter system would be simpler, without any loss of utility, as it is unlikely that any customer would want "luke-warm" coffee.

Preferably, the dispenser has two dispensing sections 32a and 32b, for two beverages (say, regular and decaffeinated coffee), and possibly another for hot water (not shown). In the drawing and the following discussion, the identical elements in each section are given identical numbers, distinguished by the appended letter, so that check valve 13a is in section 32a, check valve 13b is in section 32b, etc. The discussion below will omit the letters for clarity's sake. The connections to the controller 30 will not be individually discussed, but are shown for clarity. Control lines from the controller 30 to valves and pumps are shown as dash-dotted lines - ·-, while sensor lines from sensors to the controller 30 are shown with double dots as - ··-.

Although the invention is shown and described herein as it would be implemented with two dispensing sections 32a and 32b, it will be understood that the invention might be implemented for more than two beverages by adding sections 32c, 32d . . . etc. Similarly, a single-beverage version is produced by omitting section 32b.

In each dispensing section there is a supply of beverage in liquid concentrate form. Preferably, this is held in a one-half or one-gallon size "bag in box" reservoir 12, as is common to prior art dispensers. The coffee bag in a box is easily replaced from the front of the dispenser. These reservoirs keep the concentrate in a collapsible plastic bag inside a corrugated cardboard box. As the liquid is drained from the bag, it collapses within the box, so that no air vent need be supplied and air does not contact the liquid to cause any deterioration of the product prior to consumption. At the outlet of the reservoir 12 is a check valve 13, which has a very low forward actuation pressure of, for example, approximately 0.1 psi, but which will prevent any flow of fluid or air back into the reservoir.

FIG. 1, section 32a, shows an embodiment of the invention in which a separate concentrate pump 17 is used. FIG. 1, Section 32b shows an alternate embodiment where the concentrate pump 117 is part of the reservoir 12b, as discussed in more detail in provisional application 60/642,311 and (not yet received), which are incorporated herein by reference.

Referring to section 32a, the output of the check valve flows into a multiport (preferably four-way) junction 15. One of the ports is used to mount a product-out sensor 14, which will detect if the reservoir 12 has run dry. This may be a simple thermistor, which will heat up when it is not immersed in liquid, or some other sensor known to the art. Another port leads to pump 17, and the fourth port is an input for the automatic washing system described below, if one is provided.

A positive-displacement pump 17 is used to dispense precise amounts of liquid concentrate beverage to T-junction 34, where it mixes with precise amounts of controlled temperature water from beverage valve 18. Pump 17 is shown as being of the peristaltic type, but it will be recognized that other kinds of pumps could be used within the teaching of the invention, so long as the pump is capable of dispensing a determined amount of concentrate.

Section 32b shows an alternate embodiment to 32a, in which the moving part of the pump 117 is a formed as part of the reservoir 12b, with the solenoid 118 actuating the moving part of the pump 117, as is described in two provisional applications—Ser. Nos. 60/642,311, filed Jan. 7, 2005, entitled "Beverage Dispenser with Disposable Pump" and Ser. No. 60/682,107, filed May 18, 2006, entitled "Plastic Pump for Beverage and Soap Dispensing", both of which are incorporated here by reference. These two embodiments differ in the structure of the moving part of the pump, which may be a piston, as disclosed in provisional 60/642,311 or a flexible chamber design in which the outer part of the chamber moves up and down, as disclosed in 60/682,107. Additional split-pump embodiments, in which the moving part is incorporated into the reservoir and is actuated by a solenoid in the dispenser, such as diaphragm pumps, bellows pumps, oscillating pumps, or other designs are possible within the teachings of the invention.

The amount of concentrate dispensed by pump 117 can be controlled by pulsing the solenoid 118, with each stroke of the pump dispensing a known amount of beverage concentrate. With the pump 117 before the T-junction 14b, the output which goes to the pump in 32a runs to the mixing junction 34b instead. The rest of the description of section 32a, above is applicable to 32b.

Preferably, the ratio of concentrate to water can be varied, particularly for cold beverages, to vary the strength of the dispensed beverage. A variation of about 10% would be preferred, although wider or narrower variation could be chosen as desired by controlling the amount of concentrated beverage relative to the amount of water.

The temperature of the mixed beverage is measured by sensor 20, which allows the microprocessor controller to precisely control the temperature of the beverage by altering the duty cycle of valves 7 and 11. Since the amount of water entering the dispenser is measured by flow sensor 5, and the amount of concentrate is controlled by the speed of the peristaltic pump, the microprocessor controller 30 can control the strength of the beverage by altering the speed of peristaltic pump 17 or, in the embodiment using pump 117, by varying the number of strokes per second.

Finally, the beverage is dispensed into the cup or container 21 through spigot 22. The rapid and turbulent flow through the tubing and spigot create a rapid equilibrium state and promote complete mixing of concentrate and water, eliminating "stripes" as the beverage is dispensed.

Preferably, a dispensing tray 35 is provided under the spigot 22 area, with a perforated grid or shelf 36 for the containers to sit upon. The tray is preferably drained through a tube 37 to the usual building drains, so that any spilled or over-filled beverage is carried away, and to allow the automatic washing system described below to operate.

In operation of the preferred embodiment of the invention, the consumer selects their desired coffee temperature and strength pressing soft buttons on the touch screen display 31 of the microprocessor controller 30, and initiates dispensing by pulling on the dispense lever 19 on the desired beverage.

Alternately, a dispensing quantity can be set or programmed into the microprocessor controller 30 or selected from the touch screen 31. This would be desirable in behind-the-counter rather than self-serve applications, where a pot can be placed under the spigot and automatically filled while the wait staff performs other functions.

Figure 5:
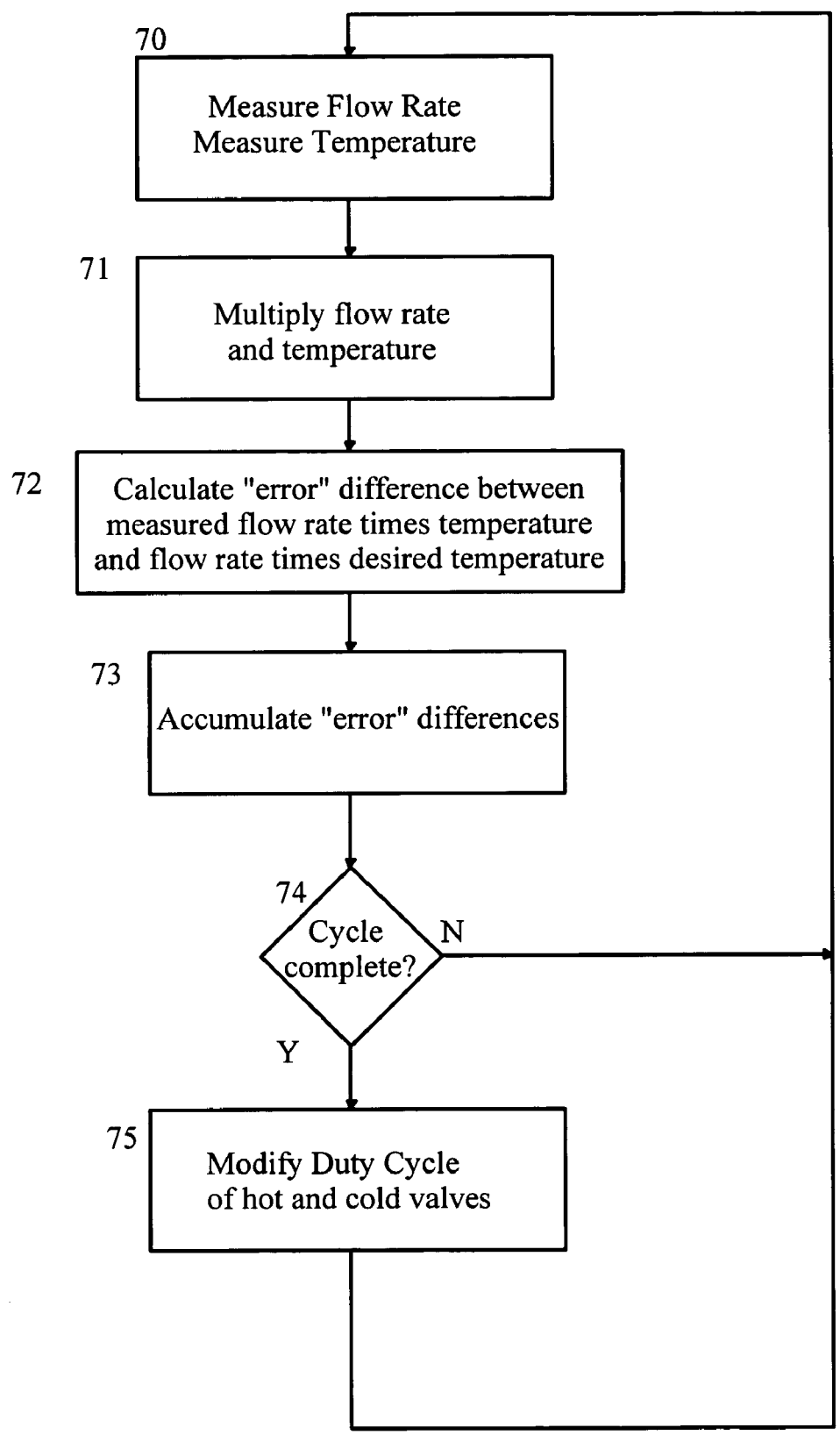
FIG. 5 shows a flowchart of a method of temperature control of the invention.

In order to achieve a very high accuracy of the dispensed beverage temperature independent of the cup size, one has to overcome the problem of the cooling of the trapped water in the tubes and the cooling of the valve's body by a different amount between dispensing sessions, since the time between successive users, and the temperature chosen by each user, is random. A preferred embodiment of the invention uses a computer controlled digital feedback control system to achieve very high accuracy of the dispensed beverage temperature The temperature control system of the preferred embodiment operates as follows (FIG. 5):

70) The temperature of the dispensed beverage $T_i$ is measured by sensor 20 at high rate, for example at 512 Hz (or every 2 msec.). The dispensed coffee flow rate $\Phi_i$ is measured continually by measuring the input water flow rate as measured by flow meter 5.

71) The digital feedback controller multiplies the measured temperature of the dispensed coffee by the measured flow rate, times the time interval between two successive readings of the temperature sensor 20, giving a temperature-flow quantity $t_i$.

$$t_i = \Phi_i \times T_i \times \Delta t$$

72) The temperature-flow quantity $t_i$ is subtracted from what the quantity should have been if the dispensed coffee temperature during this short time interval was equal to the selected one ($T_s$). The result of this subtraction is stored as an "error" $\Delta E_i$.

$$\Delta E_i = (T_i \times \Phi_i) - (T_s \times \Phi_i) = \Phi_i \times (T_i - T_s)$$

73) All the "errors" are added up during each period of one cycle of valves 7 and 11.

$$E_i = \Sigma \Delta E_i$$

74) If the time period has not elapsed, the method loops back to the beginning and measures the flow and temperature again.

75) When the time period is elapsed, the duty cycle of valves 7 and 11 is changed to minimize the error, and the method begins again.

For example, in our preferred embodiment the hot valve 7 and the cold valve 11 are pulse width modulated at cycle rate of 2 Hz. Therefore the errors are added up for half a second. At the end of each half second the duty-cycle of each valve is recalculated by the controller code according to the accumulated "error" size and polarity in such a way as to minimize the accumulated error in the next half second cycle and bring it to zero. For example, if the accumulated error is positive (i.e. the temperature of the dispensed beverage is higher than the selected temperature), the duty cycle of the hot valve will be decreased and the duty cycle of the cold valve will be increased, and vice versa.

Using the described method enables the dispensing of beverages at the selected temperature with accuracy of better then +/−1%, independent of the cup size. In addition, because each cycle is very short compare with the dispensing time the method achieves immediate temperature mixing in the cup.

In a preferred embodiment, the dispenser of the invention offers a fully automatic computer controlled washing and sanitizing function. This automatic daily washing and sanitizing system cleans all the dispenser parts and tubes through which concentrate coffee is flowing. The automatic daily washing and sanitizing system prevents build-up of coffee deposits on the inner walls of the tubes and valves that encourages the growth of bacteria and results in bad tasting coffee. Finally, this system will prolong the life of the tubes and provide for labor-free maintenance.

The automatic washing system uses a tank of detergent 23 and a pump 24. The output of the pump 24 mixes with filtered and regulated input water controlled by wash valve 25 in multiport junction 26. The wash valve 25 may be connected to the cold water, as shown, or can optionally be connected to the hot water supply The junction is vented to the vent/drain output 28 under the control of vent solenoid valve 27. Diluted detergent in the output 29 of the multiport junction 26 is connected through check valve 16 to the multiport junction 15 in each of the beverage sections 32. The check valve 16 preferably has an opening pressure of 6-10 psi, which is much higher than the 0.1 psi opening pressure of check valve 13 on the product reservoir 12, so that the check valve 16 remains closed and detergent is not sucked into the system when the dispenser is in normal operation. Also to ensure that detergent will not be sucked accidentally into the system when the dispenser is in normal operation, the vent valve 27 is always opened when the dispenser dispenses beverage.

The operation of the automatic washing system may be initiated either by a manual command at the touchscreen 31, or on a timed basis, set to operate after the restaurant using the dispenser has closed for the night.

Figure 6:
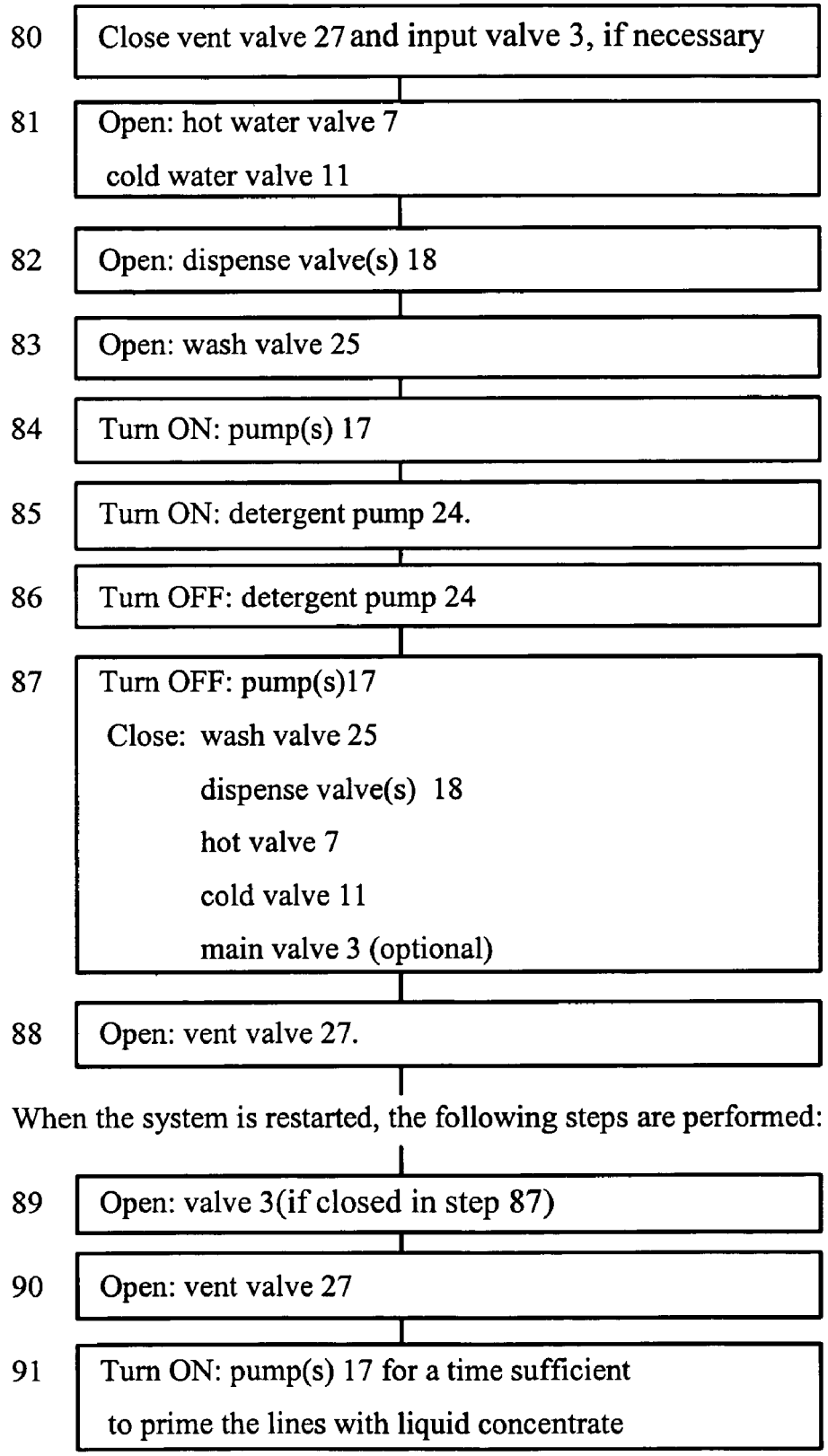
FIG. 6 shows a flowchart of a method of automatic cleaning of the machine of the invention.

When the automatic wash cycle is initiated, it performs the following steps (FIG. 6):

80) vent valve 27 is closed and input valve 3 is opened (if it was closed).
81) hot water valve 7 and cold water valve 11 are opened to provide hot water at a safe temperature for washing.
82) dispense valve(s) 18 are fully opened.

Water now flows through the system, and out the spigots 22 to the tray 35 and out the drains 37.

83) wash valve 25 is fully opened.
84) pump(s) 17 is turned on.

Because the pressure from the water supply through valve 25 (14-16 psi) check valve(s) 16 open, while check valve(s) 13 are held closed, preventing water from flowing backward into the concentrate supply. Water from the supply runs through valve 25, junction 26, check valve(s) 16 and peristaltic pump(s) 17 to empty through spigot(s) 22 to the drain 37. The entire system is now being flushed with clean water. The system may now wait for a predetermined time for the initial rinse.

85) turn on detergent pump 24.

Detergent is now being pumped from tank 23 by pump 24, diluted with incoming water from valve 25 in multiport 26, and is flowing through the check valve(s) 16 and peristaltic pump(s) 17 to empty through spigot(s) 22 to the drain 37. The detergent pump 24 is left on a predetermined period of time to sterilize the system.

86) turn off detergent pump 24 to rinse out the system.

The entire system is once again being flushed with clean water. The system may now wait for a predetermined time for the final rinse.

87) turn off pump(s) 17, wash valve 25, dispense valve(s) 18, hot valve 7, and cold valve 11. If desired or required because of the regulator design, input valve 3 may also be closed in this step.
88) open vent valve 27. If desired, vent valve 27 may be closed after a chosen period to give the system time to drain.

When the system is restarted, the following steps are performed:

89) if valve 3 was closed in step 87, above, open valve 3.
90) open vent valve 27, if it was closed in step 88, above.
91) turn on pump(s) 17 for a time sufficient to prime the lines with liquid concentrate (a few seconds or revolutions of the pump 17 should be adequate).

The dispenser is once again ready for operation. Because the vent valve 27 is open, when pump(s) 17 operate the much lower opening pressure of check valve(s) 13 cause fluid to be drawn from reservoir(s) 12, rather than pulling air through the higher resistance of check valve(s) 16 through the now drained wash system. The vent valve 27 being open, no detergent can be drawn accidentally into the dispensing system by vacuum behind check valve(s) 16.

The washing system of the preferred embodiment is thus made possible through the "flip/flop" action of the operating pressure of check valve(s) 13 being much lower than the operating pressure of check valve(s) 16.

The preceding discussion described a single dispenser of the invention. However, in commercial operations there might be a need for multiple dispensing machines. The external closed-loop heater 8 and heat exchanger 6 system of the invention lends itself to such an application.

Figure 4A:
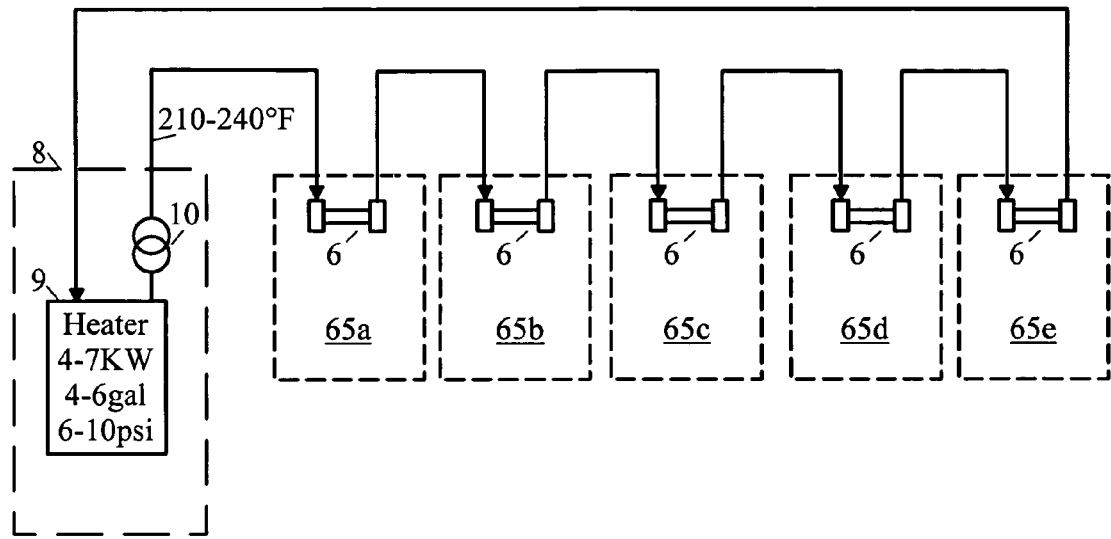
FIGS. 4a and 4b show arrangements of multiple machines of the invention, as used with a single source of circulating hot water.
Figure 4B:
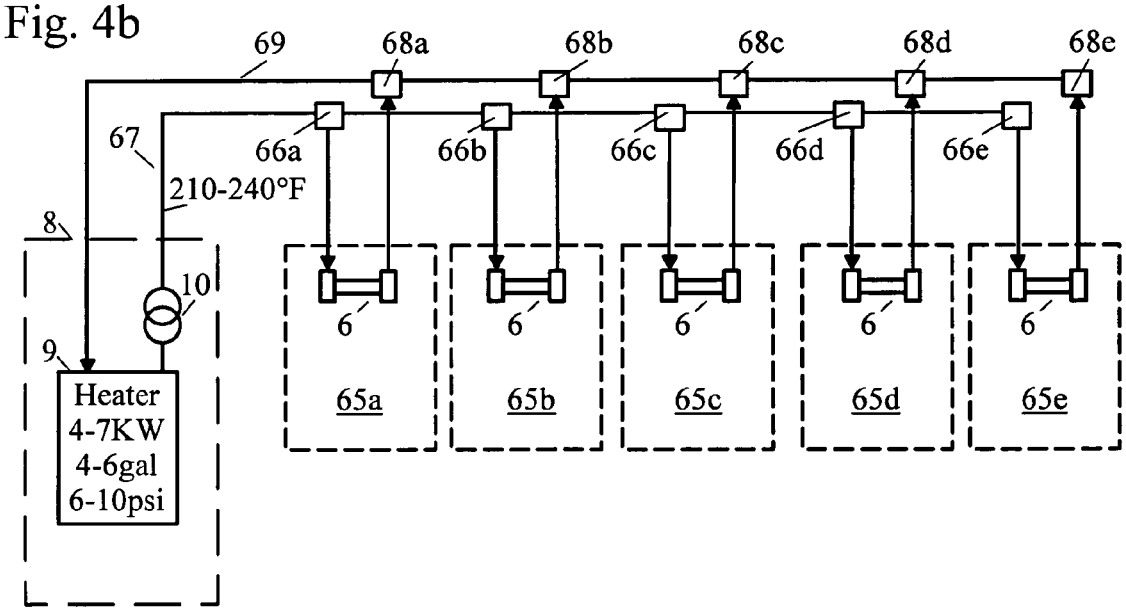

As shown in FIG. 4a, the heated water could be passed through the machines (65a through 65e) in series, or, as shown in FIG. 4b, in parallel. The series arrangement of FIG. 4a would give the same flow rate to all of the machines, but would be harder to add or remove machines from the loop. The parallel arrangement of FIG. 4b would have a lower (divided) flow rate in each machine, but putting quick-disconnect fittings 66a-e and 68a-e on supply plenum 67 and exhaust plenum 69, respectively, would make it easy to add or remove machines without disrupting the flow of hot water through the other machines.

Commercial Coffee Brewer Embodiment

Figure 2:
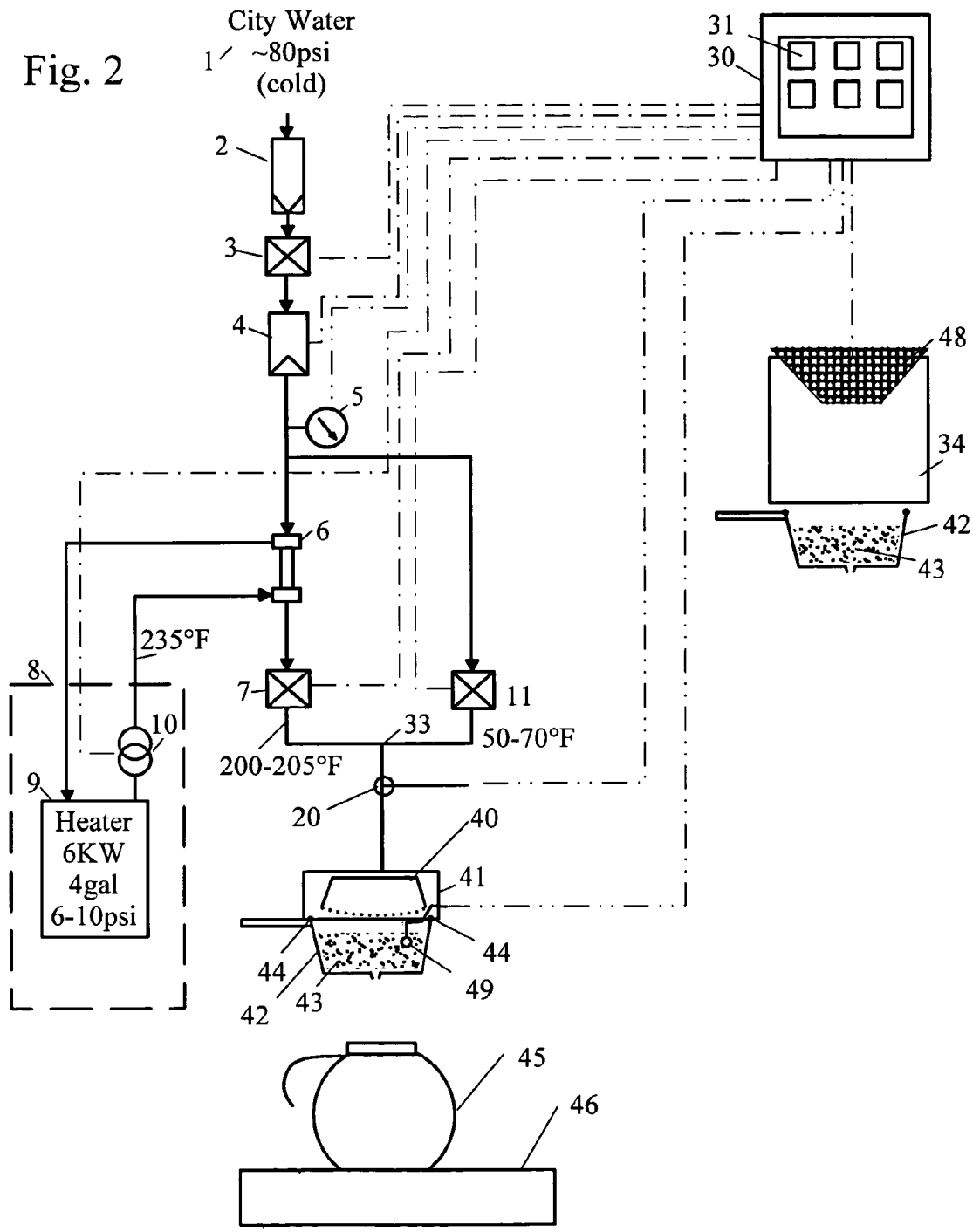
FIG. 2 shows an overall block diagram of a coffee brewer embodiment of the invention.

FIG. 2 shows a commercial coffee brewer using the heat exchanger and controls from the liquid coffee embodiment of the invention. The individual elements in FIG. 2 which are the same as in FIG. 1 are given identical reference numbers, and the description of FIG. 1, above, may be referred to for the details and operation of these elements.

Using the external closed-loop heater 8 to heat the incoming high pressure fresh water instantly via heat exchanger 6 and microcomputer controller 30, which controls the hot water temperature system, can overcome the disadvantages of current coffee brewers which were described above. The result will be a superior coffee brewer which will brew high quality coffee with much higher cup yields per pound of coffee.

High pressure incoming fresh water 1 (typically city water at 70-80 psi) is regulated by the (preferably computer controlled) pressure regulator 4 down to the desired pressure, and heated to the extraction optimal temperature (195-205° F.) in heat exchanger 6. The output hot water from heat exchanger 6, controlled by hot water solenoid valve 7 is joined with incoming cold water controlled by cold water solenoid valve 11 in T-junction 33. By reading the temperature at the outlet through temperature sensor 20 and the incoming water flow rate through flow meter 5, the controller 30 can vary the duty cycle of valves 7 and 11 to provide precise control of the brewed coffee temperature. The controlled temperature water is supplied to the spraying head 40 in brewer enclosure 41.

A second temperature sensor 49 is preferably installed in the coffee ground basket 42 and is used by the controller to measure the temperature of the coffee ground (cake). This will enable the controller to better optimize the extraction temperature which will improve the coffee test, aroma and soluble yield.

The holding basket 42 with the ground coffee beans 43 will be sealably mounted to the brewer chamber 41 forming a high pressure seal 44 around the spraying head 40. The brewed coffee passes out the bottom of the basket 42 into the pot 45, preferably sitting on a heater 46.

Because of the high pressure of the hot water, the hot water from the spraying head 40 will be pushed by the water pressure through the ground coffee beans 43 in a short time (typically 1-3 minutes at a rate of 0.5 gal/min or higher). It will also allow using finely ground coffee beans, which will increase the extraction efficiency. The high pressure, time, uniform flow through the grind bed, finely ground coffee beans, optimal temperature and the short brewing time will improve the soluble extraction yield and result in high quality coffee.

Using our digital feedback control system (as was explained before) to control the dispensed coffee temperature there are at least three method of extraction A. In order to dispense coffee at the selected temperature, the brewer may inject very hot water (200-210° F.) and cold water (50-70° F.) in short pulses. For example; hot water for 8 sec. and cold water (60° F.) for 2 sec., repeating until the brewing is completed. This mode of operation also has the advantage that the actual brewing time is composed of many very short brewing periods.

B. A second possible mode of operation is to program the hot water temperature profile as a function of time. For example; starting very hot to heat up the ground coffee to the extraction temperature in a short time, and then lowering the water temperature in such a way that the brewed coffee temperature will be at the selected temperature.

C. A third possible method of controlling the brewed coffee temperature is to keep the hot water solenoid open and control the duty cycle of the cold water solenoid valve 11 to provide brewed coffee at the selected temperature.

The high pressure brewer of the invention will allow the optimization of the brewing parameters i.e pressure, temperature, brewing time and brewing mode to achieve a high quality coffee and a high efficiency extraction. This will increase the cup yield over existing coffee makers.

In order to achieve high consistency and accurate proportions between the coffee ground and water, an automatic coffee grinder 34 is preferably attached to the brewer. The brewer computer base controller will also control the operation of the grinder. When the brewer operator selects a batch size and coffee strength, the controller will: (a) control the operation of the grinder to grind the correct amount of coffee beans 48 at the correct grind size into basket 42, and (b) optimize the extraction time to the selected batch size and grind size, by adjusting the water pressure via pressure regulator 4.

Adjusting the water pressure as a function of the batch size and grind size is desirable in order to optimize extraction time. This is due to the fact that a thinner layer of ground coffee beans presents less resistance for the water to flow through then a thicker layer. In addition, a fine grind size presents more resistance then a coarse grind size.

Espresso Machine Embodiment

Figure 3:
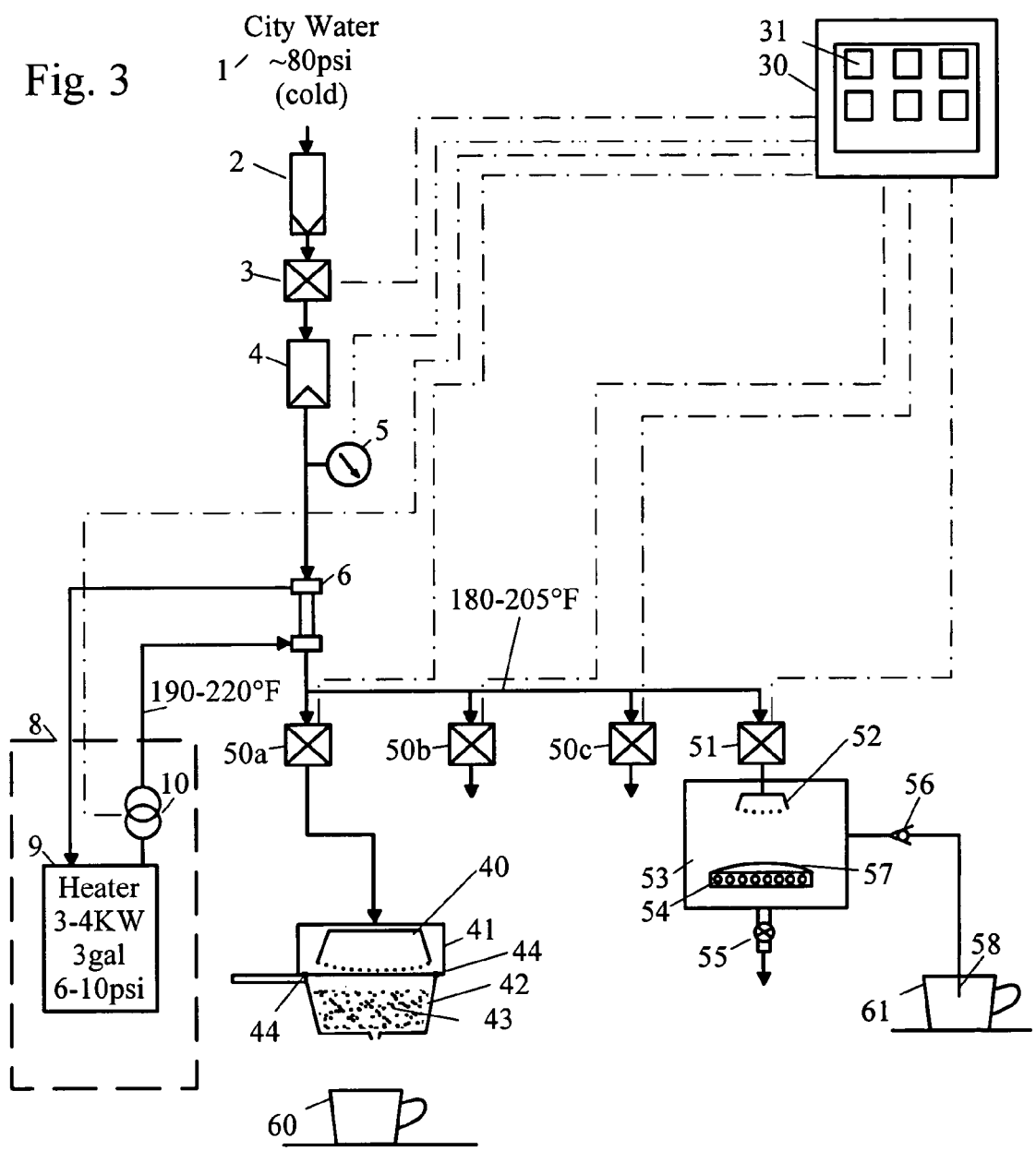
FIG. 3 shows a block diagram of a part of a high-pressure espresso machine embodiment of the invention.

Current commercial and domestic espresso machines are very expensive. The main reason is that espresso machines operate at high pressure. Therefore conventional espresso machines must be built with water heating tanks capable of holding the high pressure. This requires an expensive water tank made of thick stainless steel walls, and all the ports must be designed for high pressure. Additionally, hot water sits in the tank for many hours, resulting in depletion of minerals as they are deposited on the water tank walls. Depleting the minerals from the water degrades the coffee taste. Deposition of minerals on the water tank walls, sensors and heating elements results in shortened life of the heater and degradation of machine performance The espresso machine embodiment of the invention is shown in FIG. 3. The individual elements in FIG. 3 which are the same as in FIGS. 1 and 2 are given identical reference numbers, and the descriptions of FIGS. 1 and 2, above, may be referred to for the details and operation of these elements.

As in the other embodiments, incoming city water 1 is filtered 2, pressure regulated 4 and metered 5. The water is heated in heat exchanger 6, which in this embodiment is fed from external heater 8 with heated fluid at 190-220° F. This heats the water to 200-205° F., and it is fed to a number of brewing station solenoid valves 50a, 50b, 50c, which control dispensing of the heated water to associated brew stations.

One brew station is shown, in which hot water is supplied at high pressure up to 80 psi or higher, depending on the city water pressure, to the spraying head 40. The holding basket 42 with the ground coffee beans 43 will be mounted to the brewer 41 forming a high pressure seal 44 around the spraying head 40. The espresso passes out the bottom of the basket 42 into the espresso cup 60.

A steam chamber station 53 provides steam for steaming milk in the espresso. At the demand for steam, valve 51 is opened and hot water is injected through the shower head 52 onto a hot (>220° F.) evaporating plate 57, heated by electric heating elements 54, which will evaporate part of the hot water and create steam. Valve 51 preferably has high resistance to water to flow through (ie very small opening), so that there will be a large pressure drop across the valve, and the water is sprayed on the evaporating plate at a relative low pressure compared to the supply pressure.

The steam will start to build pressure in the chamber, when the pressure will reach the cracking pressure of check valve 56 it will start to flow out into the steam pipe 58 in cup 61. At the end of the steam cycle valve 51 will close, the pressure will drop, and check valve 56 will close, which will stop any remaining steam in the chamber from exiting. The water that will not turn to steam can be drained from the bottom by opening the drain valve 55.

In order to have an instant supply of steam, the evaporating plate 57 preferably has two heating elements 54 in parallel. The first is a low power heater can be on all the time, and will keep the evaporating plate 57 at a high temperature. The second heating element would be a high power heater, which supplies the needed energy to evaporate the water, which will be turned on only during the time when steam is dispensed. The high power heater can be turned on when valve 51 is opened, and turned off when the valve is closed. Alternatively, the high-power heater could be thermostatically controlled, or a single heater could be used.

Using the external closed-loop heater of the invention to heat the incoming high pressure fresh water instantly, has the following advantages over prior art espresso machines:

A. Lower cost due to elimination of the expensive high pressure water tank.
B. By supplying fresh, high quality hot water, the problems of deposition and depletion of minerals are avoided, resulting in improved coffee taste and longer operating lifetime.
C. Operation at a higher pressure shortens the extraction time.
D. Elimination of the water tank permits a machine to be designed with a smaller "footprint".

In order to achieve high consistency and accurate proportions between the coffee grounds and water, an automatic coffee grinder may be attached to the espresso machine, as discussed in the embodiment of FIG. 2, above.

In the claims, it will be understood that when one element is recited as "coupled" to another, that this coupling may be direct, or there may be other elements between the recited elements, all such variations intended to be within the scope of the claim.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

LISTING OF REFERENCE NUMBERS

1 City Water (tap water) supply
2 Input water filter
3 Input Valve
4 Water Pressure Regulator
5 Flow Meter
6 Heat Exchanger
7 Hot water Solenoid Valve
8 External circulating hot water supply
9 Hot water heater
10 water circulating pump
11 Cold water Solenoid Valve
12a/b Beverage ½ concentrate
13a/b Beverage ½ concentrate Valve
14a/b Out-of-product sensor—Beverage ½ concentrate
15a/b Multiport junction—Beverage ½
16a/b Detergent Check Valve—Beverage ½
17/117 Pump—beverage ½
18a/b Beverage ½ Dispense Valve
19a/b Beverage ½ dispensing lever
20a/b Temperature Sensor—Beverage ½
21a/b Beverage cup ½
22a/b Beverage ½ dispense outlet
23 Detergent Tank
24 detergent low flow pump
25 wash water Solenoid Valve
26 Detergent mixing multiport junction
27 Air vent Solenoid Valve
28 Vent/Drain
29 Wash line
30 Microprocessor controller
31 Touchscreen
32a/b Beverage station ½
33 T junction mixing hot and cold water
34 Coffee Grinder (FIG. 2)
35 Dispensing tray
36 Drain Board
37 Overflow Drain for tray
40 Shower head (FIGS. 2/3)
41 Brew chamber (FIGS. 2/3)
42 Holding basket (FIGS. 2/3)
43 Coffee beans (FIGS. 2/3)
44 Seal (FIGS. 2/3)
45 Pot (FIG. 2)
46 Pot heater (FIG. 2)
48 Coffee Beans (FIG. 2)
49 Brew basket temp.sensor (FIG. 2)
50a-c Expresso brew valves (FIG. 3)
51 Steam valve (FIG. 3)
52 Steam shower head (FIG. 3)
53 Steam chamber (FIG. 3)
54 Heating elements (FIG. 3)
55 Steam chamber drain valve (FIG. 3)
56 Steam check valve (FIG. 3)
57 Evaporation plate (FIG. 3)
58 Steam outlet (FIG. 3)
60 Espresso cup (FIG. 3)
61 Espresso cup for steaming (FIG. 3)
65a-e Beverage machines (FIG. 4)
66a-e quick disconnects (FIG. 4)
67 Supply Plenum (FIG. 4)
68a-e quick disconnects (FIG. 4)

69 Supply Plenum (FIG. 4)
118 Solenoid for valve 117 (FIG. 1)

What is claimed is:

1. A beverage dispenser comprising:
   a) a controller, comprising:
      i) at least one control signal output
      ii) at least one sensor input;
      iii) a user input interface;
      iv) control logic coupled to the at least one control signal output, the at least one sensor input and the user input interface, such that the control logic controls at least one control signal output in response to user input at the user input interface;
   b) a source of circulating hot liquid;
   c) a water input coupled to a pressurized water supply;
   d) a liquid-to-liquid heat exchanger having an input coupled to the water input, an output for heated water, and a heat-exchange circuit through which the circulating hot liquid from the source of circulating hot liquid circulates, such that water from the input is heated by exchange with the hot liquid, and the water exits from the output of the heat exchanger at an elevated temperature;
   e) a hot valve having an input coupled to the output of the heat exchanger, a control input for controlling flow through the valve in response to a signal from a control output of the controller, and an output for dispensing hot water under control of the control input; and
   f) a beverage dispensing output coupled to the output of the hot valve,
   such that the water flows through the dispenser under pressure, from the pressurized water supply through the heat exchanger and the hot valve under control of the controller, and is dispensed by the beverage dispensing output, without being held in storage.

2. The beverage dispenser of claim 1, further comprising:
   a) a cold valve having an input coupled to the water input, a control input for controlling flow through the valve in response to a signal from a control output of the controller and an output for dispensing cold water under control of the control input;
   b) a temperature mixing junction coupled to the output of the hot valve and the output of the cold valve, for mixing the hot water and cold water into a mixed water stream coupled to the beverage dispensing output; and
   c) a temperature sensor sensing the temperature of the mixed water stream, having an output coupled to a sensor input of the controller;
   the control logic of the reading the temperature of the mixed water stream from the sensor input coupled to the temperature sensor, and the controller issuing signals on the control output coupled to the control input of the hot valve and on the control output coupled to the control input of the cold valve, such that the stream of mixed water is maintained at a selected temperature.

3. The beverage dispenser of claim 2, in which control signals sent to the hot valve and the cold valve are pulse-width modulated, such that the flow through each valve is controlled by varying a duty cycle of the pulse-width modulated signals.

4. The beverage dispenser of claim 2, further comprising at least one dispensing section comprising:
   a) a reservoir of beverage concentrate having an outlet;
   b) a pump having an input coupled to the output of the reservoir outlet, an output, and a control input coupled to a control output of the controller, such that a signal on the control input causes the pump to pump a defined amount of beverage concentrate from the pump output;
   c) a section water input coupled to the temperature mixing junction, for accepting the mixed water stream at the defined temperature;
   d) a beverage mixing junction in which the beverage concentrate and the mixed water stream are mixed, having inputs coupled to the section water input and the pump output, and an output coupled to the beverage dispensing output; and
   e) a flow sensor sensing water flow in the water input, coupled to a sensor input of the controller;
   the control logic of the controller reading the water flow from the flow sensor and operating the pump to mix a selected amount of beverage concentrate with the water, such that the beverage dispensing output of the beverage dispenser dispenses beverages of a selected concentration and temperature.

5. The beverage dispenser of claim 4, further comprising a beverage valve in the mixed stream of water, between the temperature mixing junction and the beverage mixing junction, having a control input coupled to a control output of the controller such that quantity of the mixed water stream into the beverage mixing junction is controlled by the controller through a signal on the control input of the beverage valve.

6. The beverage dispenser of claim 4, further comprising
   a) a washing junction having a first input coupled to the beverage concentrate reservoir through a first check valve, a second input, and an output coupled to the dispensing output;
   b) a supply of washing fluid, comprising:
      i) a reservoir of detergent;
      ii) a detergent pump having an input coupled to the reservoir of detergent, and an output;
      iii) a wash water valve having an input coupled to the water input of the dispenser, a control input coupled to a control output of the controller, and an output;
      iv) a wash liquid mixing junction having an input coupled to the output of the detergent pump, an input coupled to the output of the wash water valve, and an output for diluted detergent coupled to the second input of the washing junction through a second check valve, the second check valve having an opening pressure much higher than an opening pressure of the first check valve;
   such that when the wash water valve is opened and the detergent pump is operated, a quantity of diluted detergent is sent from the wash liquid mixing junction through the washing junction, and the dispensing output of the beverage dispenser.

7. The beverage dispenser of claim 6, further comprising a drain valve coupled to the wash liquid mixing junction, for draining diluted detergent remaining in the wash liquid mixing junction.

8. The dispenser of claim 4, in which the pump is a positive displacement pump.

9. The dispenser of claim 8, in which the positive displacement pump is a peristaltic pump.

10. The dispenser of claim 8, in which the positive displacement pump comprises a moving part formed as part of the reservoir, and a solenoid for operating the moving part mounted to the dispenser.

11. The dispenser of claim 10, in which the moving part is a piston.

12. The dispenser of claim 10, in which the moving part is an outer part of a flexible chamber.

13. The beverage dispenser of claim 2, further comprising:
a) a pressurizable enclosure;
b) a holding basket for coffee grounds, pressure sealed to the enclosure, having an outlet at a bottom of the basket coupled to the beverage dispensing output of the beverage dispenser;
c) a spraying head inside the enclosure, coupled to the temperature mixing junction, located above the basket, such that the mixed water stream from the temperature mixing junction is sprayed onto the grounds in the holding basket, such that coffee is extracted from the grounds and dispensed through the bottom of the basket at the selected temperature.

14. The beverage dispenser of claim 13, further comprising a grounds temperature sensor located in the holding basket for measuring the temperature of the coffee grounds, having an output coupled to a sensor input of the controller.

15. The beverage dispenser of claim 14, in which control logic of the controller operates the hot valve and the cold valve to inject hot and cold water alternately in short pulses until brewing is completed.

16. The beverage dispenser of claim 14, in which control logic of the controller operates the hot valve and the cold valve to vary the temperature of the mixed water stream as a function of time.

17. The beverage dispenser of claim 13, further comprising a coffee grinder having a control input coupled to a control output of the controller.

18. The beverage dispenser of claim 1, further comprising:
a) a pressurizable enclosure;
b) a holding basket for coffee grounds, pressure sealed to the enclosure, having an outlet at a bottom of the basket coupled to the beverage dispensing output of the beverage dispenser;
c) a spraying head inside the enclosure, coupled to output of the hot valve, located above the basket, such that the hot water from the hot valve is sprayed onto the grounds in the holding basket, and coffee is extracted from the grounds and dispensed through the bottom of the basket.

19. The beverage dispenser of claim 18, further comprising:
a) a steam valve having an input coupled to the output of the heat exchanger and an output;
b) a steam chamber having a steam output, a spray head coupled to the output of the steam valve, and a heated evaporating plate located in the chamber such that water from the spray head sprayed on the evaporating plate flashes into steam and leaves under pressure through the steam output.

20. The beverage dispenser of claim 1, further comprising a pressure regulator between the water supply and the water input.

21. The beverage dispenser of claim 1, in which the source of circulating hot liquid is located remotely.

22. The beverage dispenser of claim 1, in which the source of circulating hot liquid comprises a heater, a reservoir for storing hot liquid, and a circulating pump for pumping liquid through the reservoir, the heater and the heat exchanger.

23. The beverage dispenser of claim 1, further comprising a dispensing valve lever adjacent to the beverage dispensing output and coupled to a sensor input of the controller, such that the controller logic begins dispensing beverage in response to operation of the dispensing valve lever.

24. The beverage dispenser of claim 1, in which the operator interface comprises a touch-screen.

25. The beverage dispenser of claim 4, in which the temperature sensor is positioned adjacent to the beverage dispensing output, so that it measures the temperature of the mixed water stream after mixing with the beverage concentrate.

* * * * *